US012680445B1

(12) United States Patent　　　(10) Patent No.:　　US 12,680,445 B1
Katayama et al.　　　　　　　　　(45) Date of Patent:　　　Jul. 14, 2026

(54) LOW INCLINATION MAGNETOMETER BIAS COMPENSATION FOR DYNAMIC SURVEYING

(71) Applicant: Schlumberger Technology Corporation, Sugar Land, TX (US)

(72) Inventors: Makito Katayama, Clamart (FR); Andrew Whitmore, Stonehouse (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/218,705

(22) Filed: May 27, 2025

(51) Int. Cl.
| | |
|---|---|
| *E21B 47/002* | (2012.01) |
| *E21B 47/022* | (2012.01) |
| *E21B 47/04* | (2012.01) |
| *G01V 3/26* | (2006.01) |
| *G01V 3/38* | (2006.01) |

(52) U.S. Cl.
CPC ............ *E21B 47/022* (2013.01); *E21B 47/04* (2013.01); *G01V 3/26* (2013.01); *G01V 3/38* (2013.01)

(58) Field of Classification Search
CPC ........ E21B 47/002; E21B 47/04; E21B 47/07; G01V 3/26; G01V 3/38; G01V 11/00; G01K 1/02; G01K 3/14; G01K 15/00; G01K 15/18; G01P 21/00
See application file for complete search history.

(56) References Cited

U.S. PATENT DOCUMENTS

| | | | | |
|---|---|---|---|---|
| 5,585,726 | A * | 12/1996 | Chau ......................... | G01V 3/26 |
| | | | | 175/45 |
| 11,898,432 | B2 | 2/2024 | Whitmore | |
| 12,123,297 | B1 * | 10/2024 | Katayama ................. | E21B 7/04 |
| 2005/0199425 | A1 * | 9/2005 | Estes ................... | H04L 63/0272 |
| | | | | 175/50 |
| 2013/0151158 | A1 * | 6/2013 | Brooks ................. | E21B 47/022 |
| | | | | 702/92 |
| 2021/0108502 | A1 * | 4/2021 | Whitacre ................. | G01V 3/38 |
| 2022/0251938 | A1 * | 8/2022 | Whitmore ................. | E21B 7/06 |

* cited by examiner

*Primary Examiner* — Yong-Suk (Philip) Ro
(74) *Attorney, Agent, or Firm* — Jeffrey D. Frantz

(57) ABSTRACT

A method for drilling includes rotating a BHA in a wellbore. Triaxial accelerometer and triaxial magnetometer measurements are made while rotating the BHA using corresponding triaxial accelerometer and triaxial magnetometer sets that are deployed in a roll-stabilized housing. Magnetic dip angles are computed from the accelerometer and magnetometer measurements using an inclination independent model. The computed dip angles are compared with a reference magnetic dip angle and a magnetometer bias is selected that minimizes a difference between the computed magnetic dip angles and the reference magnetic dip angle.

15 Claims, 5 Drawing Sheets

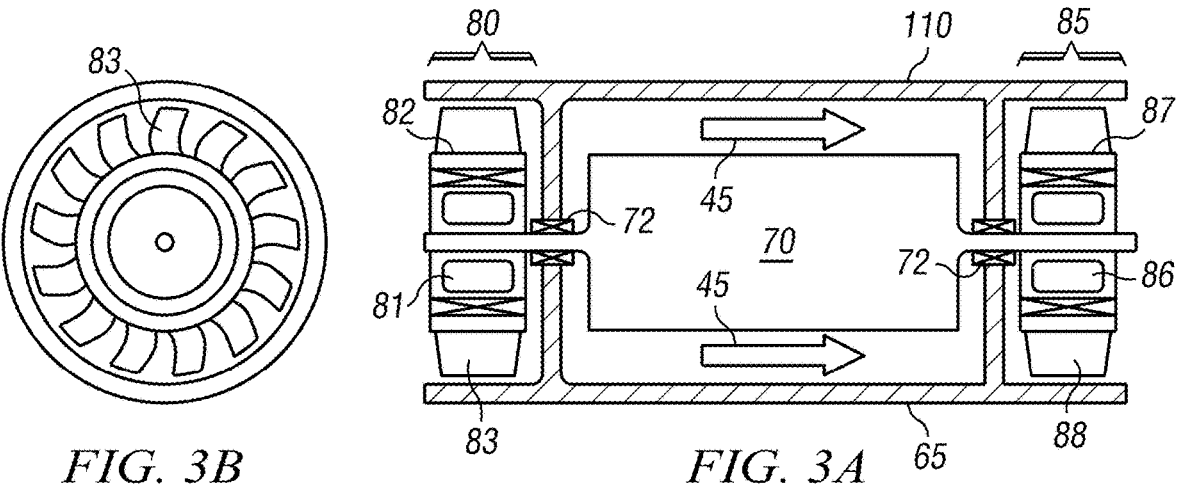

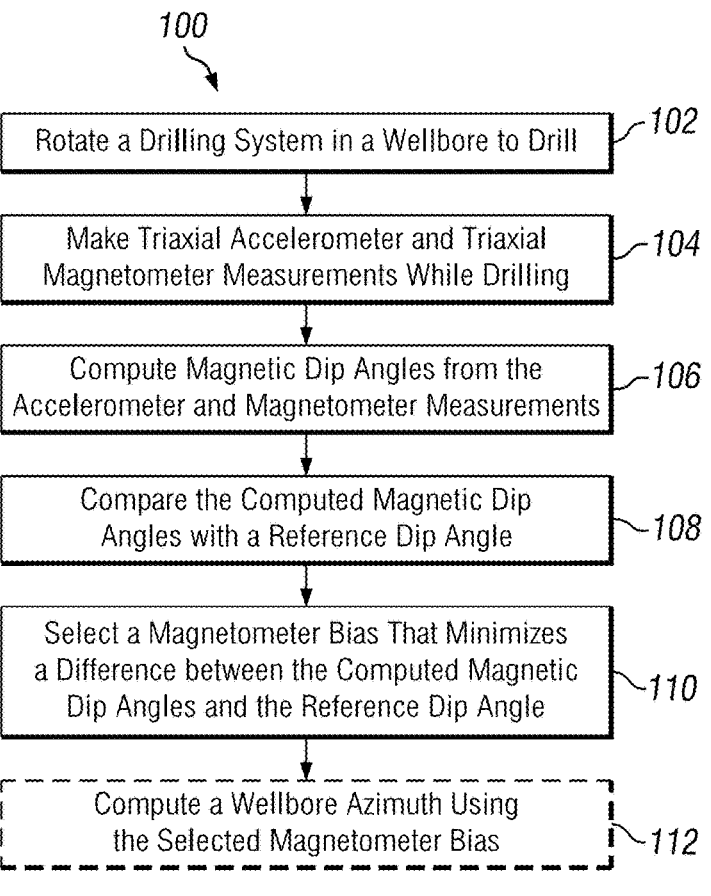

| Rotate a Drilling System in a Wellbore to Drill | 102 |

| Make Triaxial Accelerometer and Triaxial Magnetometer Measurements While Drilling | 104 |

| Compute Magnetic Dip Angles from the Accelerometer and Magnetometer Measurements | 106 |

| Compare the Computed Magnetic Dip Angles with a Reference Dip Angle | 108 |

| Select a Magnetometer Bias That Minimizes a Difference between the Computed Magnetic Dip Angles and the Reference Dip Angle | 110 |

| Compute a Wellbore Azimuth Using the Selected Magnetometer Bias | 112 |

*FIG. 5*

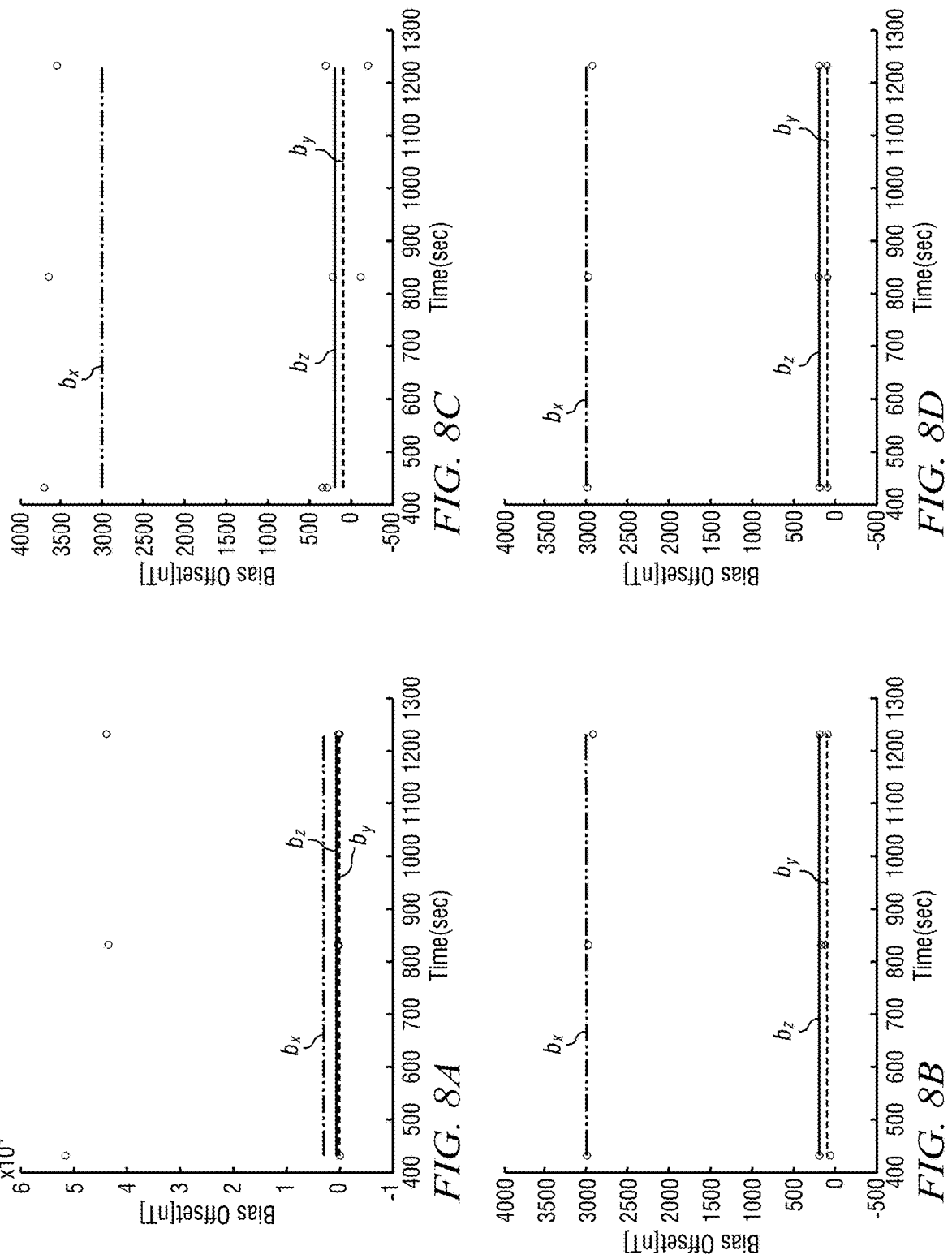

LOW INCLINATION MAGNETOMETER BIAS COMPENSATION FOR DYNAMIC SURVEYING

FIELD

Disclosed embodiments relate generally to surveying while drilling methods in rotary systems employing a roll-stabilized housing and more particularly to surveying methods for obtaining wellbore azimuth while drilling.

BACKGROUND

Wellbore attitude (inclination and azimuth) measurements are commonly made while drilling. Static survey measurements have long been made at a discrete number of longitudinal points along the axis of the wellbore when drilling has temporarily stopped, and the drill string has been lifted off the bottom of the wellbore. These discrete measurements may be assembled into a survey of the well and used to calculate a three-dimensional well path (e.g., using the minimum curvature or other curvature assumptions).

More recently, methods have been developed to make continuous (dynamic) survey measurements in real time while drilling. These dynamic surveys have been a break-through in the drilling industry in that they significantly increase survey density and enable accurate surveys to be obtained while drilling. While the development of dynamic surveying measurements has been a break-through, such measurements can be prone to error, for example, from magnetic interference such as eddy current induced magnetic fields and uncompensated magnetometer bias. There is a need in the industry for improved dynamic surveying methods, particularly dynamic azimuth measurements that account for uncompensated magnetometer bias.

SUMMARY

Systems and methods for compensating magnetometer bias while making continuous wellbore surveys are disclosed. One example disclosed method for drilling a wellbore includes rotating a bottom hole assembly (BHA) in the subterranean wellbore to drill. The BHA including a drill collar, a drill bit, and a roll-stabilized housing deployed in the drill collar and configured to rotate with respect to the drill collar. Triaxial accelerometer and triaxial magnetometer sets are deployed in the roll-stabilized housing. The triaxial accelerometer and magnetometer sets are used to make corresponding triaxial accelerometer measurements and triaxial magnetometer measurements while rotating the BHA. Magnetic dip angles are computed from the accelerometer and magnetometer measurements using an inclination independent model. The computed dip angles are compared with a reference magnetic dip angle and a magnetometer bias is selected that minimizes a difference between the computed magnetic dip angles and the reference magnetic dip angle.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which:

FIGS. 3A and 3B (collectively FIG. 3) depict a schematic representation of a roll-stabilized housing deployed in a downhole tool.

FIG. 5 depicts a flowchart of one example method for estimating magnetometer bias while drilling.

FIGS. 8A, 8B, 8C, and 8D (collectively FIG. 8) depicts plots of computed magnetometer bias versus time for a nonlimiting synthetic example.

DETAILED DESCRIPTION

A disclosed method includes rotating a BHA in a wellbore (e.g., to drill). Triaxial accelerometer and triaxial magnetometer measurements are made while rotating the BHA using corresponding triaxial accelerometer and triaxial magnetometer sets that are deployed in a roll-stabilized housing. Magnetic dip angles are computed from the accelerometer and magnetometer measurements using an inclination independent model. The computed dip angles are compared with a reference magnetic dip angle and a magnetometer bias is selected that minimizes a difference between the computed magnetic dip angles and the reference magnetic dip angle.

Example embodiments disclosed herein may provide various technical advantages and improvements over the prior art. For example, an improved method and system for drilling a subterranean wellbore includes making dynamic survey measurements, such as wellbore azimuth measurements, in substantially real time while drilling a well (e.g., several measurements per minute or several measurements per foot of measured depth of the wellbore). The disclosed embodiments are particularly well suited for low inclination (near vertical) wellbores and may provide an accurate compensation (accounting for) magnetometer bias (and optionally eddy currents) and therefore accurate wellbore azimuth measurements in such low inclination wellbores.

Figure 1:
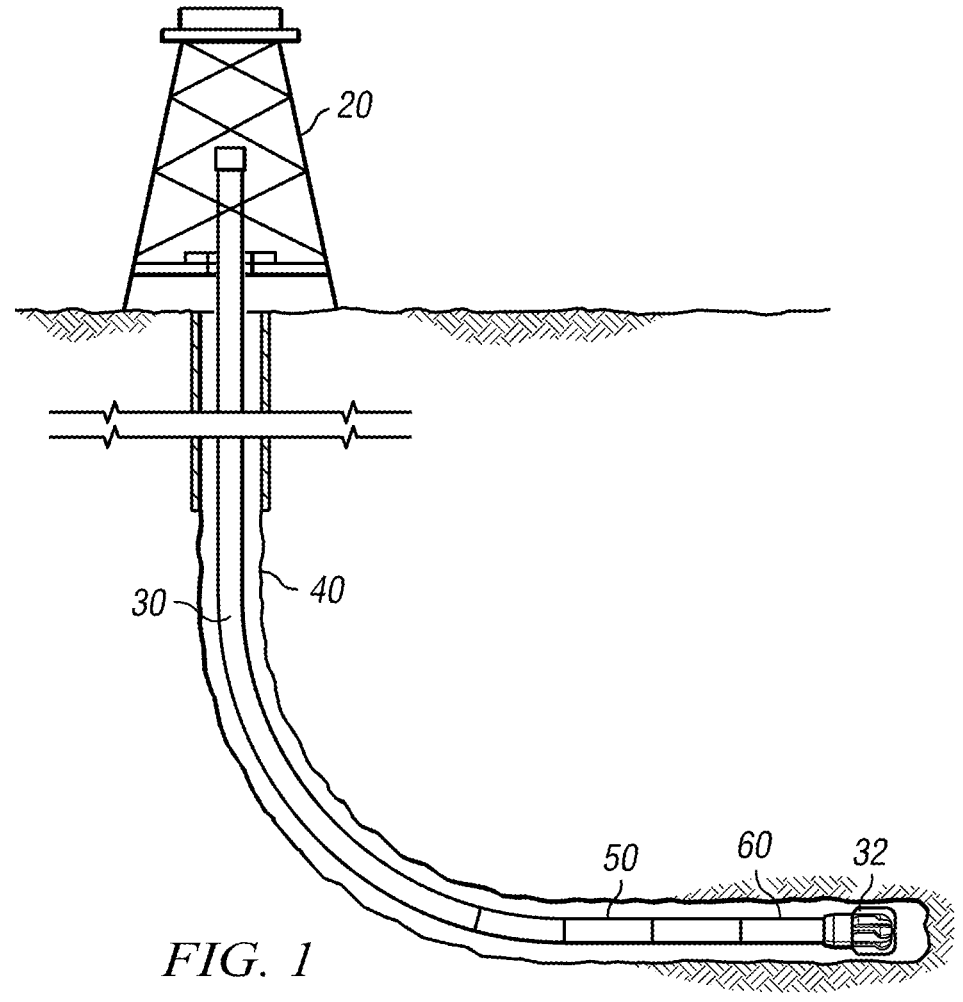
FIG. 1 depicts a drilling rig including a disclosed drilling system.

FIG. 1 depicts a drilling rig 20 including a disclosed drilling system (e.g., including a disclosed rotary steerable tool 60 or a disclosed measurement while drilling tool 50). The drilling rig 20 is positioned over a subterranean formation and may include a derrick and a hoisting apparatus (not shown) for raising and lowering a drill string 30, which, as shown, extends into wellbore 40 and includes a drill bit 32, measurement while drilling (MWD) tool 50 and a rotary steerable tool (RSS) 60. As is known to those of ordinary skill in the art, the drill string 30 may further include a downhole drilling motor, a downhole telemetry system (e.g., deployed in or adjacent to MWD tool 50), and one or more logging while drilling (LWD) tools 50 including various sensors for sensing downhole characteristics of the wellbore and the surrounding formation. The disclosed embodiments are not limited in these regards.

It will be understood by those of ordinary skill in the art that the deployment illustrated on FIG. 1 is merely an example. It will be further understood that disclosed embodiments are not limited to an onshore deployment as depicted. The drilling rig 20 may be deployed onshore or offshore. As is further known to those of ordinary skill, offshore rigs commonly include a platform deployed atop a riser that extends from the sea floor to the surface. The drill string extends downward from the platform, through the riser, and into the wellbore through a blowout preventer (BOP) located on the sea floor. The disclosed embodiments are expressly not limited in these regards.

Figure 2:
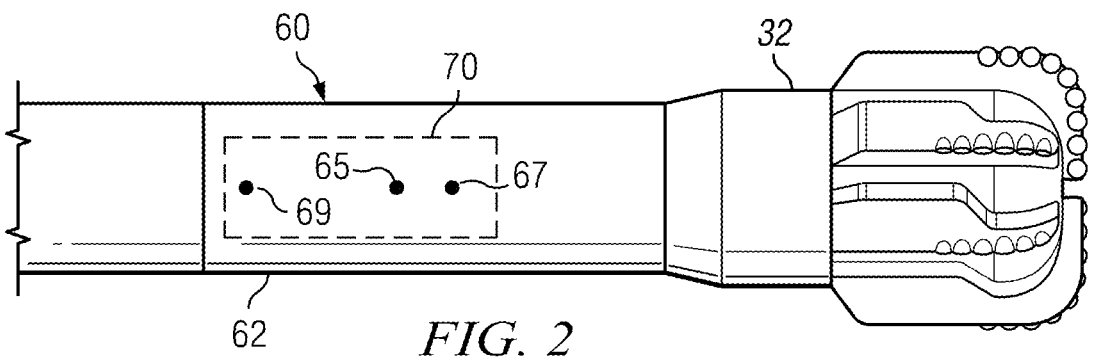
FIG. 2 depicts a lower BHA portion of the drill string shown on FIG. 1.

FIG. 2 depicts the lower BHA portion of drill string 30 (FIG. 1) including drill bit 32 and RSS 60. The RSS may include substantially any suitable rotary steerable system including a roll-stabilized controller (or control unit) deployed in a roll-stabilized housing or an otherwise substantially non-rotating or geostationary housing 70. By roll-stabilized it is meant that the sensor housing is substantially non-rotating with the respect to the wellbore (or may at times rotate slowly in comparison to the drill string). For example, various PowerDrive rotary steerable systems include a drill collar that is intended to fully rotate with the drill string and an internal roll-stabilized control unit that is intended to remain substantially rotationally geostationary (i.e., rotationally stable about the tool axis). Other rotary steerable systems include a substantially non-rotating (or very slowly rotating) outer housing employing blades that engage the wellbore wall.

While FIG. 2 depicts RSS 60, it will be understood that the disclosed embodiments are not limited to the use of an RSS. Moreover, while navigation sensors 65 and 67 (e.g., accelerometers and magnetometers) may be deployed in and the corresponding sensor measurements processed in a RSS (e.g., as depicted on FIG. 2), they may also be located in a roll-stabilized housing located substantially anywhere in the drill string. For example, with reference again to FIG. 1, drill string 30 may include a measurement while drilling tool 50 including corresponding sensors 65 and 67 deployed in a roll-stabilized housing. As is known to those of ordinary skill in the art, such MWD tools 50 may further include a mud pulse telemetry transmitter or other telemetry system, an alternator for generating electrical power, and an electronic controller. It will thus be appreciated that the disclosed embodiments are not limited to any specific deployment location of the navigational sensors in the drill string.

The example RSS 60 (or MWD tool 50) depicted include(s) tri-axial accelerometer 65 and tri-axial magnetometer 67 navigation sensor sets deployed in housing 70. These navigation sensors may include substantially any suitable available devices. Suitable accelerometers for use in sensor set 65 may include, for example, conventional Q-flex types accelerometers or micro-electro-mechanical systems (MEMS) solid-state accelerometers. Suitable magnetic field sensors for use in sensor set 67 may include, for example, conventional ring core flux gate magnetometers or magnetoresistive sensors. The navigations sensor may further optionally include gyroscopic sensors such as rate gyro(s) or MEMS type gyro(s).

With continued reference to FIGS. 1 and 2, RSS 60 and/or MWD tool 50 may further optionally include a rotation rate sensor 69 configured to measure a difference in rotation rates between the roll-stabilized housing 70 and the drill collar 62 (which is equal to the rotation rate of the collar when the roll-stabilized housing is geostationary). Substantially any suitable rotation rate sensors may be utilized, for example, including a sensor (or sensors) deployed in the roll-stabilized housing 70 and one or more markers (such as magnetic markers) deployed on the collar 62. In example embodiments, the sensor(s) may send an electrical pulse to a controller each time one of the markers rotates by the sensor and the rotation rate may be computed from the time interval between pulses. In one example embodiment, the sensor includes a Hall-effect sensor and the markers may be magnetic markers, although the invention is expressly not limited in this regard.

FIGS. 3A and 3B (collectively FIG. 3) depict a schematic representation of one example of a roll-stabilized housing 70 (e.g., a sensor housing) deployed in RSS 60 (FIG. 2). It will be understood that this is merely an example and that the disclosed method embodiments are not limited to any particular roll-stabilizing mechanism or configuration. In the depicted example, the roll-stabilized housing 70 is mounted on bearings 72 such that it is rotationally decoupled from (able to rotate independently with respect to) tool collar 62. In the depicted example embodiment, first and second alternators 80, 85 (e.g., of the permanent magnet synchronous motor type) are separately mounted on opposing axial ends of the roll-stabilized housing 70. The corresponding stator windings 81, 86 are mechanically continuous with the roll-stabilized housing 70 (and are therefore rotationally coupled with the roll-stabilized housing). Corresponding rotors including permanent magnets 82, 87 are configured to rotate independently of both the roll-stabilized housing 70 and the tool collar 62. Impeller blades 83, 88 are mechanically contiguous with the corresponding rotors and span the annular clearance between the housing 70 and the tool collar 62 such that they rotate, for example, in opposite directions with the flow of drilling fluid 45 through the tool.

In the depicted example embodiment, the rotational orientation of the housing 70 may be controlled by the co-action of the alternators 80 and 85 in combination with feedback provided by the navigation sensors 65, 67 (e.g., accelerometers and/or magnetometers) deployed in the housing 70. The impellers 83 and 88 being configured to rotate in opposite directions apply corresponding opposite torques to the housing 70. The amount of electrical load on the torque generators 80 and 85 may be changed in response to feedback from the at least one of the sensors 65 and 67 (FIG. 2) to vary the applied torques and thereby control the orientation of the housing. When used in a rotary steerable system, the control unit may have an output shaft that is rigidly connected to a rotary valve. The rotary valve directs fluid from the flow to an actuator in a steering bias unit, which then acts to steer the tool (e.g., by acting on the wellbore wall or by acting on a bit shaft). Thus, by controlling the orientation of the control unit, the orientation of the rotary valve is controlled, thereby providing steering control.

With continued reference to FIGS. 2 and 3, it will be appreciated that rotation of the collar 62 or roll-stabilized housing 70 in the Earth's magnetic field may cause an eddy current (or currents) therein (owing to the Lorentz force created by the Earth's field penetrating the rotating members). These eddy currents may create additional magnetic fields along a radial axis of the BHA and thereby interfere with the magnetic field measurements (made by sensor set 67). Moreover, the magnitude of the eddy currents and the corresponding interfering magnetic fields may depend on the size and geometry of the drill collar, the rotation rate of the drill collar and/or housing, and the type of drilling fluid utilized in the drilling operation. There is a need for methods to compensate (account) for interfering magnetic fields generated by eddy currents (particularly since these fields can change during the drilling operation).

It will also be appreciated that magnetometer measurements can be biased and that the bias may be dependent on the magnetization of the collar and other tool structures in the vicinity of the sensors. While multi-station analysis (MSA) has been used to remove a constant bias offset, it has been found that the bias offset can change within (during) a drilling operation and that surface data and measurements are generally not sufficient to model the changing bias offset over time and depth while drilling. There is a further need for methods to compensate (account) for offset bias of the magnetometers, particularly offset bias that changes during a drilling operation.

Figure 4:
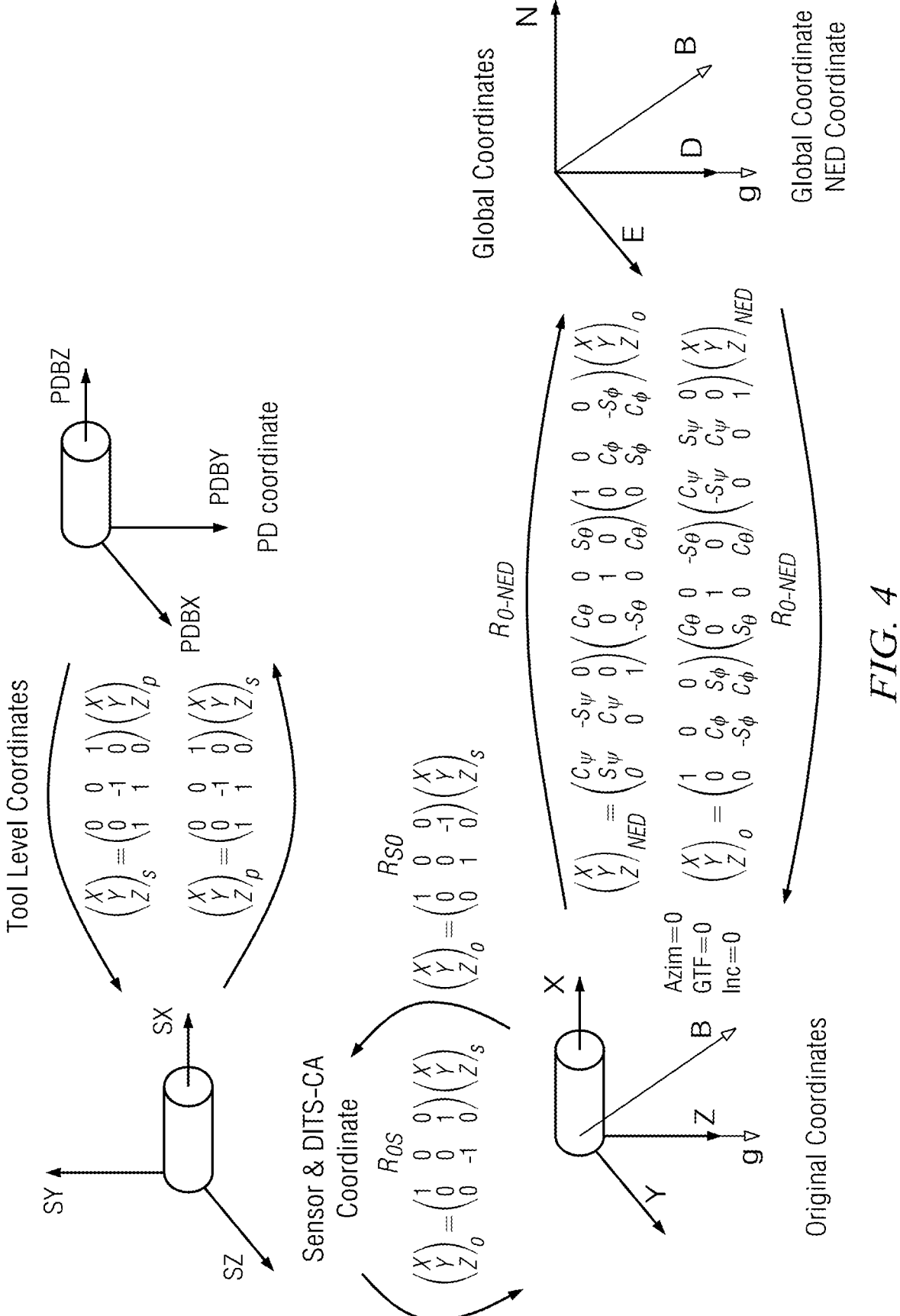
FIG. 4 depicts multiple coordinate systems and their relationship to one another.

FIG. 4 depicts multiple coordinate systems and their relationship to one another. A global north-east-down (NED) coordinate system is commonly used in the industry for simplicity (with north and east referring to north and east directions on the surface of the earth and down referring to a direction pointing directly towards the gravitational center of the earth). Multiple commonly used tool coordinate systems are also shown in FIG. 4, including a PowerDrive (PD) coordinate system, a Sensor (S) coordinate system, and an Original (O) coordinate system. FIG. 4 further shows mathematical transformations that may be used to convert measurements from one coordinate system to another. As used herein, the original O coordinate system is defined to align with the NED coordinate system at zero azimuth, zero toolface, and zero pitch angle (the pitch angle is defined as the inclination minus ninety degrees). The relationship between the NED and original (tool) coordinate systems may be expressed mathematically, for example, as follows:

$$\begin{pmatrix} X \\ Y \\ Z \end{pmatrix}_{NED} =$$

$$R_{NED-O}\begin{pmatrix} X \\ Y \\ Z \end{pmatrix}_O = \begin{pmatrix} C_\psi & -S_\psi & 0 \\ S_\psi & C_\psi & 0 \\ 0 & 0 & 1 \end{pmatrix}\begin{pmatrix} C_\theta & 0 & S_\theta \\ 0 & 1 & 0 \\ -S_\theta & 0 & C_\theta \end{pmatrix}\begin{pmatrix} 1 & 0 & 0 \\ 0 & C_\phi & -S_\phi \\ 0 & S_\phi & C_\phi \end{pmatrix}\begin{pmatrix} X \\ Y \\ Z \end{pmatrix}_O$$

$$\begin{pmatrix} X \\ Y \\ Z \end{pmatrix}_O =$$

$$R_{O-NED}\begin{pmatrix} X \\ Y \\ Z \end{pmatrix}_{NED} = \begin{pmatrix} 1 & 0 & 0 \\ 0 & C_\phi & S_\phi \\ 0 & -S_\phi & C_\phi \end{pmatrix}\begin{pmatrix} C_\theta & 0 & -S_\theta \\ 0 & 1 & 0 \\ S_\theta & 0 & C_\theta \end{pmatrix}\begin{pmatrix} C_\psi & S_\psi & 0 \\ -S_\psi & C_\psi & 0 \\ 0 & 0 & 1 \end{pmatrix}\begin{pmatrix} X \\ Y \\ Z \end{pmatrix}_{NED}$$

where C represents cosine, S represents sine, $\psi$ represents the azimuth, $\phi$ represents the gravity tool face, and $\theta$ represents the pitch angle. For a coordinate system employing inclination (rather than pitch angle), the relationship between the NED and original coordinate systems may be expressed, for example, as follows:

$$\begin{pmatrix} X \\ Y \\ Z \end{pmatrix}_{NED} =$$

$$R_{NED-O}\begin{pmatrix} X \\ Y \\ Z \end{pmatrix}_O = \begin{pmatrix} C_\psi & -S_\psi & 0 \\ S_\psi & C_\psi & 0 \\ 0 & 0 & 1 \end{pmatrix}\begin{pmatrix} S_I & 0 & -C_I \\ 0 & 1 & 0 \\ C_I & 0 & S_I \end{pmatrix}\begin{pmatrix} 1 & 0 & 0 \\ 0 & C_\phi & -S_\phi \\ 0 & S_\phi & C_\phi \end{pmatrix}\begin{pmatrix} X \\ Y \\ Z \end{pmatrix}_O$$

$$\begin{pmatrix} X \\ Y \\ Z \end{pmatrix}_O =$$

$$R_{O-NED}\begin{pmatrix} X \\ Y \\ Z \end{pmatrix}_{NED} = \begin{pmatrix} 1 & 0 & 0 \\ 0 & C_\phi & S_\phi \\ 0 & -S_\phi & C_\phi \end{pmatrix}\begin{pmatrix} S_I & 0 & -C_I \\ 0 & 1 & 0 \\ C_I & 0 & S_I \end{pmatrix}\begin{pmatrix} C_\psi & S_\psi & 0 \\ -S_\psi & C_\psi & 0 \\ 0 & 0 & 1 \end{pmatrix}\begin{pmatrix} X \\ Y \\ Z \end{pmatrix}_{NED}$$

As disclosed in commonly assigned U.S. Pat. No. 12,123, 297, triaxial magnetometer measurements may be modelled, for example, as follows:

$$\begin{pmatrix} B_x \\ B_y \\ B_z \end{pmatrix}_i = \begin{pmatrix} 1 & 0 & 0 \\ 0 & 1 & -\gamma_s\omega_s \\ 0 & \gamma_s\omega_s & 1 \end{pmatrix}\begin{pmatrix} 1 & 0 & 0 \\ 0 & 1 & -\gamma_c\omega_c \\ 0 & \gamma_c\omega_c & 1 \end{pmatrix}\begin{pmatrix} \hat{B}_x \\ \hat{B}_y \\ \hat{B}_z \end{pmatrix} + \begin{pmatrix} b_x \\ b_y \\ b_z \end{pmatrix} + \begin{pmatrix} \varepsilon_{B_x} \\ \varepsilon_{B_y} \\ \varepsilon_{B_z} \end{pmatrix}$$

where $B_x$, $B_y$, and $B_z$ represent the triaxial magnetometer measurements in the original coordinate system at survey location i, $\hat{B}_x$, $\hat{B}_y$, and $\hat{B}_z$, represent the true magnetic field vector (or true magnetic field measurements representative of reality), $b_x$, $b_y$, and $b_z$ represent magnetometer bias, $\gamma_c$ and $\gamma_s$ represent eddy current compensation terms for drill collar rotation $\gamma_c$ and roll-stabilized sensor housing rotation $\gamma_s$, $\omega_c$ and $\omega_s$ represent the rotation rates (angular frequency) of the drill collar and sensor housing, and $\varepsilon_{B_x}$, $\varepsilon_{B_y}$, and $\varepsilon_{B_z}$ represent error terms.

U.S. Pat. No. 12,123,297 further disclosed that an interfering magnetic field may result from eddy currents in the rotating drill collar and/or sensor housing. Rotation of the collar 62 and/or housing 70 in the Earth's magnetic field may generate an eddy current in the collar 62 and/or housing 70 (owing to the Lorentz force created by the Earth's field penetrating rotating collar and/or housing). The interfering field is directed in the radial direction such that the measured field may deviate from the Earth's field. A methodology was disclosed to compensate for such eddy current interference.

The '297 Patent further disclosed a method for compensating magnetometer bias (correcting for $b_x$, $b_y$, and $b_z$) that requires inclination measurements. In one disclosed method a measured wellbore inclination, an eddy current compensation term, and the magnetometer measurements are processed with a Kalman filter to remove the magnetometer bias. In another disclosed method, wellbore inclination measurements, gravity tool face measurements, and well azimuth are input into a downhole multi-station analysis model to compute the magnetometer bias. While the disclosed methods were found to provide excellent magnetometer bias compensation and to enable survey quality wellbore azimuth measurements, there is room for further improvement. For example, in near vertical wells (e.g., at wellbore inclinations of less than about two degrees, less than about three degrees, less than about five degrees, or less than about ten degrees), the bias compensation can be prone to error (since inclination measurements and gravity tool face measurements themselves are prone to error at low inclination). There is a need for an improved (or new) method of magnetometer bias compensation in near vertical wells.

The magnetometer bias may be thought of as a semi-constant offset parameter. For example, at the survey station (or location) i, if the true magnetic field is $(\widehat{B}_x \ \widehat{B}_y \ \widehat{B}_z)^T$, then the magnetometer bias offset may be expressed as follows:

$$b = B_i - \hat{B}_i$$

where:

$$b = \begin{pmatrix} b_x \\ b_y \\ b_z \end{pmatrix}$$

-continued $$B_i = \begin{pmatrix} B_x \\ B_y \\ B_z \end{pmatrix}_i$$

$$\bar{B}_i^- = \begin{pmatrix} \bar{B}_x^- \\ \bar{B}_y^- \\ \bar{B}_z^- \end{pmatrix}$$

One aspect of the disclosed embodiments was the realization that the magnetometer bias may be estimated by using magnetometer measurements and corresponding accelerometer measurements to compute an inclination independent magnetic field parameter, such as the magnetic dip, and then compare the computed parameter with a reference parameter value. By inclination independent it is meant that the wellbore inclination is not used (or otherwise needed) to compute the magnetic field parameter. For example, it was realized that the computed magnetic dip angle may be compared with a reference magnetic dip angle for a particular drilling location. It was then further realized that the magnetometer bias may be estimated via inversion by minimizing the difference (e.g., the root mean square difference) between a large number of measured (computed) magnetic dip angles and the reference magnetic dip angle.

FIG. 5 depicts a flowchart of one example method 100 for estimating magnetometer bias while drilling and optionally determining a dynamic wellbore azimuth. Method 100 includes rotating a drilling system in a wellbore (e.g., to drill) at 102. The drilling system may include a BHA having a drill bit and an RSS including a drill collar and a roll-stabilized control unit, e.g., as described above with respect to FIGS. 2 and 3. Triaxial magnetometer (magnetic field) measurements and triaxial accelerometer (gravitational field) measurements are made using corresponding sensors located in a roll-stabilized housing at 104. Rotation rates of the drill collar and/or the sensor housing may also be measured at 104. Magnetometer bias dependent magnetic dip angles are computed at 106 using the magnetometer and accelerometer measurements made at 104 and an unknown magnetometer bias. The computed magnetic dip angles are then compared with a reference dip angle for the drilling location at 108. A magnetometer bias (e.g., a bias vector including $b_x$, $b_y$, and $b_z$) is selected at 110 (e.g., using an inversion algorithm) that minimizes the difference (or error) between the computed magnetic dip angles and the reference dip angle. A wellbore azimuth may optionally be computed at 112 from the accelerometer measurements, the magnetometer measurements, and the computed magnetometer bias.

With continued reference to FIG. 5, the true magnetic field signal may be computed from the magnetic field measurements and the magnetometer bias (assuming no other magnetic interference in this particular example), for example, as follows:

$$\bar{B}_i^- = B_i - b$$

Assuming no accelerometer bias, the true gravitational field given is as follows:

$$\bar{G}_i^- = G_i$$

The magnetic dip depends on the true magnetic and gravitational fields (such that it depends on the accelerometer measurements, the magnetometer measurements, and the magnetometer bias) and may be expressed mathematically, for example, as follows:

$$D_i(b) = \sin^{-1}\left(\frac{\bar{G}_i^{-T}\bar{B}_i^-}{|\bar{G}_i^-||\bar{B}_i^-|}\right) = \sin^{-1}\left(\frac{G_i^T(B_i - b)}{|G_i||B_i - b|}\right)$$

Note that $D_i$ depends on the accelerometer measurements $G_i$, the magnetometer measurements $B_i$ and the magnetometer bias b and is independent of the wellbore inclination (such that magnetic dip is an inclination independent parameter). It will be appreciated that magnetic dip is also independent of the wellbore azimuth, the toolface, the total magnetic field, and the total gravitational field. Differences between the computed magnetic dip angle and a reference magnetic dip angle $D_{ref}$ may be computed, for example, as follows:

$$e_i(b) = D_i(b) - D_{ref}$$

Those of ordinary skill in the art will readily appreciate that the magnetic dip angle (also referred to as the magnetic inclination) is the angle made with the horizontal by Earth's magnetic field lines with positive angular values indicating that the magnetic field is pointing into the Earth and negative values indicating that it is pointing out of the Earth. Those of ordinary skill will also readily appreciate that the magnetic dip angle strongly depends on the measurement location on the surface of the Earth (particularly on the latitude). It will still further appreciate that the magnetic dip angle at any location on Earth (e.g., as defined via the longitude and the latitude of the location) can be readily obtained using lookup tables or online calculators (e.g., from the U.S. National Centers for Environmental Information at https://www.ngdc.noaa.gov/geomag/calculators/magcalc.shtml). Such obtained magnetic dip angles are referred to herein as reference magnetic dip angles.

As described above, the foregoing equations may be inverted for the magnetometer bias that minimizes the errors $e_i$ (such as a sum of the errors or a sum of the absolute value of the errors). In one particularly advantageous example, a magnetometer bias $b=(b_x \ b_y \ b_z)^T$ may be selected that minimizes the root mean square error (difference) between the computed magnetic dip angle values and the reference value. The squared sum of the error $\epsilon$ may also be expressed, for example, as follows:

$$\epsilon(b) = e^T e$$

Here, the error vector may be as defined, for example, as below:

$$e = \begin{bmatrix} e_1 \\ \vdots \\ e_n \end{bmatrix} = \begin{bmatrix} D_1 - D_{ref} \\ \vdots \\ D_n - D_{ref} \end{bmatrix} = D(b) - D_{ref}$$

$$\text{where: } D(b) = \begin{bmatrix} D_1(b) \\ \vdots \\ D_n(b) \end{bmatrix}, D_{ref} = D_{ref}\begin{bmatrix} 1 \\ \vdots \\ 1 \end{bmatrix}$$

such that the magnetometer bias b may be selected by inversion as follows:

$$b = \underset{b}{\operatorname{argmin}} \epsilon(b)$$

Figures 6, 7:
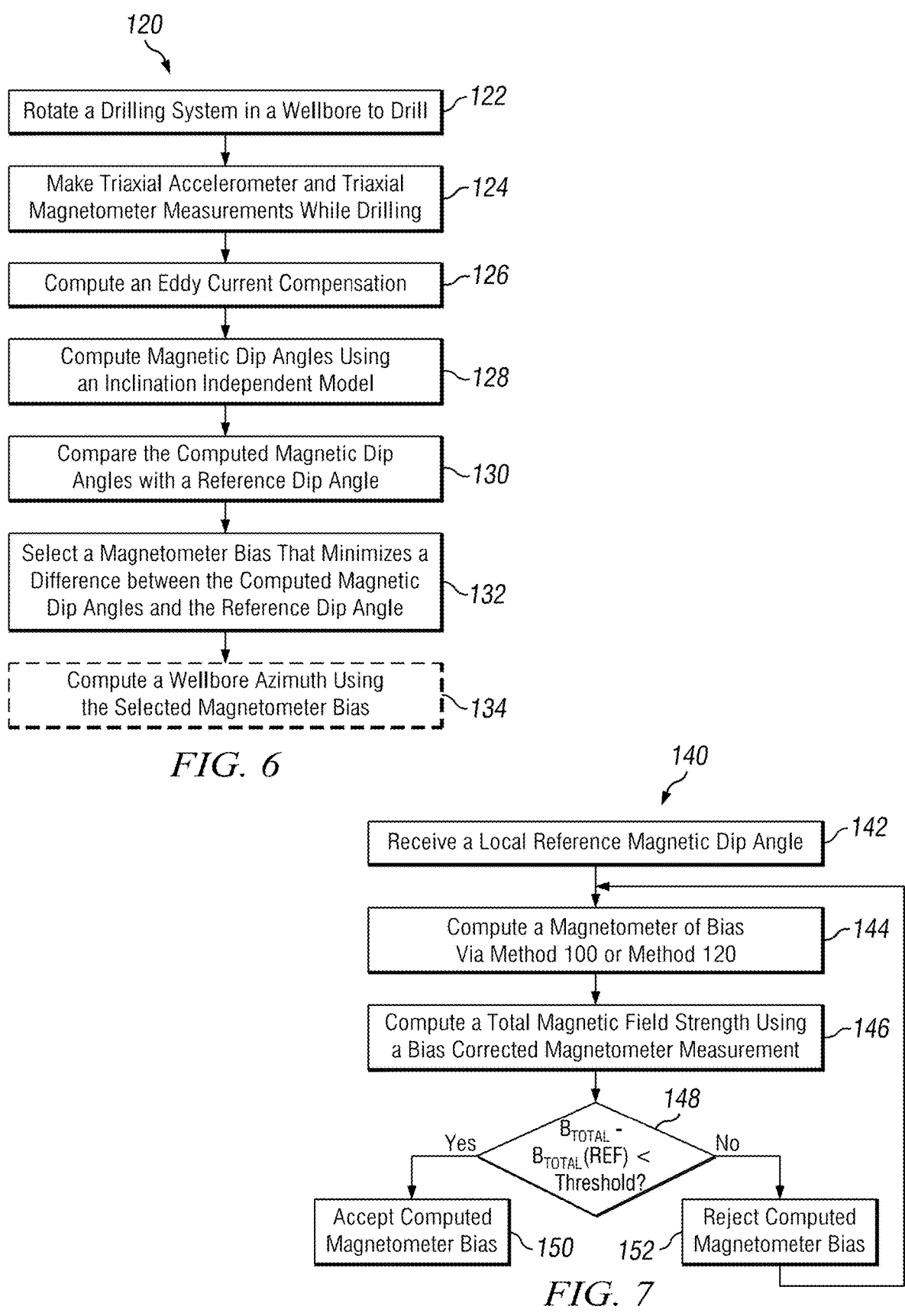
FIG. 6 depicts a flowchart of another example method for estimating magnetometer bias while drilling.
FIG. 7 depicts a flowchart of still another example method for estimating magnetometer bias while drilling.

FIG. 6 depicts a flowchart of another example method 120 for estimating magnetometer bias while drilling and optionally determining a dynamic wellbore azimuth. Method 120 is similar to method 100 in that it includes rotating a drilling system in a wellbore (e.g., to drill) at 122 and making triaxial magnetometer measurements and triaxial accelerometer measurements using corresponding sensors located in a roll-stabilized (or slowly rotating) housing at 124. Rotation rates of the drill collar and/or the sensor housing may also be measured at 124. An eddy current compensation is computed at 126, for example, from measured rotation rate(s) of the drill collar and/or the roll-stabilized housing. The accelerometer measurements, the magnetometer measurements, and the eddy current compensation are input into an inclination independent model that enables magnetometer bias dependent magnetic dip angles to be computed at 128. The inclination independent model may be further advantageously azimuth independent and gravity toolface independent. Moreover, the inclination independent model may be still further independent of the total magnetic and gravitational fields. The computed magnetometer bias dependent magnetic dip angles are compared with a reference dip angle for the drilling location at 130. A magnetometer bias (e.g., a bias vector including $b_x$, $b_y$, and $b_z$) is selected at 132 (e.g., using an inversion algorithm) that minimizes the difference (or error) between the computed magnetic dip angles and the reference dip angle. A wellbore azimuth may be optionally computed at 134 using the accelerometer measurements, the magnetometer measurements, the eddy current compensation term, and the selected magnetometer bias.

With continued reference to FIG. 6, the eddy current compensation term y may be estimated, for example, using the methods disclosed in the '297 Patent. For example, the eddy current compensation term y may be estimated from a change in angle X when the rotation rate changes. It will be appreciated that angle X is the angle between the gravity and magnetic field vectors in the y-z plane (the cross axial plane perpendicular to the axis of the BHA) and may be computed, for example, as follows:

$$X = \tan^{-1}\left(\frac{B_z G_y - B_y G_z}{B_y G_y + B_z G_z}\right)$$

In the absence of eddy currents, angle X is essentially constant at a survey station (or location). Since angle X has been found to change with changing collar rotation rate (e.g., increase with increasing rotation rate), this dependency may be used to estimate the eddy current compensation term $\gamma$ (and to estimate changes in the eddy current compensation term with a changing rotation rate of the collar). For example, the eddy current compensation term $\gamma$ may be expressed as follows:

$$\gamma = \alpha \frac{1 - \sqrt{1 - 4\frac{\omega^2}{\alpha^2}}}{2\omega^2}$$

where $\omega$ represents the collar rotation rate and $\alpha = (\gamma^2\omega^2 + 1)/\gamma$.

While the preceding equation provides a suitable solution for the eddy current compensation term $\gamma$, a simplified solution may be obtained by recognizing that the eddy current compensation term may be approximated as $\partial X_\omega / \partial X_\omega$, for example, as follows when $\omega^2 << \alpha^2$ (e.g., when $\omega^2/\alpha^2$ approaches zero):

$$\gamma = \alpha \frac{1 - \left(1 - 2\frac{\omega^2}{\alpha^2}\right)}{2\omega^2} = \frac{1}{\alpha} = \frac{\partial X_\omega}{\partial \omega}$$

This approximation provides for a more robust computation of y and advantageously has an error of less than 1 percent for most drilling conditions (e.g., collar rotation rates of less than about 300 rpm).

With still further reference to FIG. 6, the magnetometer bias may be determined at 128, 130, 132 in a manner similar to that described above with respect to method 100 (FIG. 5). In the presence of eddy current interference, the true magnetic field may be expressed, for example, as follows:

$$\widehat{B_i} = R_{eddy}(B_i - b) - w_{B_i}$$

where, as before, $\widehat{B_i}$ represents the true magnetic field vector, $B_i$ represent the magnetometer measurements, b represent the magnetometer bias vector, and $w_{B_i}$ is random noise with zero mean. $R_{eddy}$ represents a correction matrix that includes the computed eddy current compensation term y and may be given, for example, as follows:

$$R_{eddy} = \begin{pmatrix} 1 & 0 & 0 \\ 0 & f_a & f_b \\ 0 & -f_b & f_a \end{pmatrix}$$

where, in some embodiments, $f_a$ and $f_b$ may be mathematical relations of the eddy current compensation term $\gamma$ such that $f_a$ compensates the amplitude of the eddy current interference and $f_b$ compensates the phase of the eddy current interference. Assuming that there is only negligible bias in the corresponding accelerometer measurements:

$$\widehat{G_i} = G_i - w_{G_i}$$

where $\widehat{G_i}$ represents the true gravitational field vector, $G_i$ represent the accelerometer measurements, and $w_{G_i}$ is random noise with zero mean. As before, the magnetic dip angle may be expressed based on the true magnetic field and the true gravitational field (not including the random noises), for example, as follows:

$$D_i = f_i = f\left(\widehat{B_i} + w_{B_i}, \widehat{G_i} + w_{G_i}\right) = f(R_{eddy}(B_i - b), G_i)$$

where:

$$f(B, G) \equiv \sin^{-1}\left(\frac{G^T B}{|G||B|}\right)$$

such that:

$$D_i = \sin^{-1}\left(\frac{G_i^T(R_{eddy}(B_i - b))}{|G_i||R_{eddy}(B_i - b)|}\right)$$

In example embodiments a nonlinear optimization may be carried out using Gauss-Newton. However, it will be appreciated that the random noises $w_{B_i}$ and $w_{G_i}$ of magnetometer and accelerometer measurements can potentially invalidate local linearity requirements of the equation if the noise levels are high. A Monte Carlo sampling was carried out to understand the effect of random noises on the computed dip angles using the foregoing equation. In the example simulation, wellbore inclination and wellbore azimuth values were sampled over a uniform distribution from 0 to 360 degrees, the magnetic dip angle varied from −60 to 60 degrees, the total magnetic field varied from 40000 to 60000 nT and the total gravitational field was 1000 mG. Random Gaussian noises were assumed with amplitudes of 50 nT for the magnetometers and 10 mG for the accelerometers. It will be appreciated that these assumed noises are larger than what is generally observed in practice.

The dip angle error dD resulting from the magnetometer and accelerometer random noises $w_{B_i}$ and $w_{G_i}$ may be defined as given below:

$$dD = f(\widehat{B}_i + w_{B_i}, \widehat{G}_i + w_{G_i}) - D_{ref}$$

It will be appreciated that the original dip angle equation may be further simplified, for example, as given below:

$$f_i = f(\widehat{B}_i, \widehat{G}_i) + w_{D_i} = D_{ref}$$

where $w_D$ represents a random dip angle noise (with both accelerometer measurement noise and magnetometer measurement noise contributions) with zero mean such that:

$$D_i = f(\widehat{B}_i, \widehat{G}_i) = D_{ref} - w_{D_i}$$

In the foregoing equation, the function $f$ contains data samples from the magnetometers and accelerometers, which are a series of fixed value measurements. With continued reference to FIG. 6, the foregoing equation may be expressed with respect to those measurements, for example, as follows:

$$f(R_{eddy}(B_i - b), G_i) = D_{ref} - w_{D_i}$$

Since, $B_i$ and $G_i$ are fixed valued magnetometer and accelerometer measurements and since $R_{eddy}$ is a three-by-three matrix that is defined by the previously determined eddy current compensation term (at 126), the only remaining variable is the magnetometer bias b. This may be expressed mathematically in a simpler form, for example, as follows:

$$f'(b) = D_{ref} - w_{D_i}$$

Optimizing b to minimize the squared error from the true dip angle yields the following matrix equation:

$$(e = (F(b) - D)^T(F(b) - D)$$

where:

$$F(b) = \begin{pmatrix} f_1'(b) \\ \vdots \\ f_n'(b) \end{pmatrix}, \quad D = D_{ref}\begin{pmatrix} 1 \\ \vdots \\ 1 \end{pmatrix}, \quad w_{D_i} = \begin{pmatrix} w_{D_1} \\ \vdots \\ w_{D_n} \end{pmatrix}$$

The magnetometer bias vector b which minimizes e may be determined by an iteration process, such as the Gauss Newton method, for example, as defined below:

$$b_{s+1} = b_s + (J_F^T J_F)^{-1} J_F^T(D - F(b_s))$$

where $J_F$ is the Jacobian matrix of F such that:

$$J_F = \frac{\partial F(b)}{\partial b} = \begin{pmatrix} \frac{\partial f_1'(b)}{\partial b} \\ \vdots \\ \frac{\partial f_n'(b)}{\partial b} \end{pmatrix} = \begin{pmatrix} \frac{\partial f_1'(b)}{\partial b_x} & \frac{\partial f_1'(b)}{\partial b_y} & \frac{\partial f_1'(b)}{\partial b_z} \\ \vdots & \vdots & \vdots \\ \frac{\partial f_n'(b)}{\partial b_x} & \frac{\partial f_n'(b)}{\partial b_y} & \frac{\partial f_n'(b)}{\partial b_z} \end{pmatrix}$$

An analytical expression that defines $\partial f'(b)/\partial b$ is given below:

$$\frac{\partial f}{\partial b} = \frac{1}{A}\begin{pmatrix} r_x r_y(G_y f_a - G_z f_b) + r_x r_z(G_y f_b + G_z f_a) - G_x(r_y^2 + r_z^2) \\ G_x r_x r_y + r_y r_z(G_y f_b + G_z f_a) - (r_x^2 + r_z^2)(G_y f_a - G_z f_b) \\ G_x r_x r_y + r_y r_z(G_z f_a - G_z f_b) - (r_x^2 + r_y^2)(G_y f_b + G_z f_a) \end{pmatrix}^T$$

where:

$$r_x = B_x - b_x$$

$$r_y = B_y - b_y$$

$$r_z = B_z - b_z$$

$$A = (r_x^2 + r_y^2 + r_z^2)(r_x^2 + r_y^2 + r_z^2)(G_x^2 + G_y^2 + G_z^2) - (G_x r_x + G_y r_y + G_z r_z)^2$$

Note that in the foregoing equation $r_x$, $r_y$, and $r_z$ represent the bias corrected magnetometer measurements and $f_a$ and $f_b$ define the eddy current compensation matrix.

While not described above with respect to FIGS. 5 and 6, it will be appreciated that the computed wellbore azimuth may be optionally used for wellbore position and trajectory control while drilling continues. For example, the direction of drilling may be adjusted in response to computed azimuth (e.g., by adjusting the positions of blades or other actuating components in a rotary steerable tool) to continue drilling along a predetermined path.

While also not described above with respect to FIGS. 5 and 6, it will be appreciated that the roll-stabilized sensor housing may be slowly rotated with respect to the wellbore when determining the magnetometer bias. By slowly rotated it is meant that the sensor housing rotation rate is much less than the drill collar and/or BHA rotation rate. For example, the sensor housing rotation rate may be less than about 10 rpm (e.g., in a range from about 1 rpm to about 10 rpm). In one example embodiment described in more detail below by way of example, the sensor housing rotation rate is 3 rpm.

In example embodiments, the roll-stabilized sensor housing may be geostationary during certain time intervals and slowly rotating during other time intervals. For example, at predetermined time or depth intervals the roll-stabilized sensor housing may slowly rotate for a predetermined time (e.g., 1 or 2 minutes) or a predetermined number of rotations (e.g., 2, 4, or 6 full rotations). In such embodiments, the magnetometer and accelerometer measurements may be made at 104, 124 while the sensor housing is slowly rotating. Rotation rates of the drill collar and/or the sensor housing may also be measured at 104, 124.

FIG. 7 depicts a flow chart of still another method 140 for estimating magnetometer bias. A local reference magnetic dip angle is received at 142. The magnetometer bias is estimated at 144, for example, via method 100 or method 120 described above with respect to FIGS. 5 and 6. The bias corrected magnetometer measurements are then used to compute a total magnetic field strength at 146. The computed total magnetic field strength may be compared with a local reference value of the total magnetic field strength at 148. When a difference between the computed total magnetic field strength and the reference value of the total magnetic field strength is less than a predetermined threshold (e.g., within 500 nT) the magnetometer bias determined at 144 is accepted at 150. When the difference between the computed total magnetic field strength and the reference value of the total magnetic field strength are greater than the threshold, then within a predetermined threshold the magnetometer bias determined at 144 is rejected at 152.

With continued reference to FIG. 7, the total magnetic field strength $B_{TOT}$ may be computed at 146, for example, as follows:

$$B_{TOT} = \sqrt{B_x'^2 + B_y'^2 + B_z'^2}$$

where $B'_x$, $B'_y$, and $B'_z$ represent the x-, y-, and z-axis bias corrected magnetometer measurements. It will be appreciated that the magnetometer bias quality control check at 148, 150, 152 may advantageously eliminate false or incorrect magnetometer bias estimates. For example, when there is external magnetic interference that changes the dip angle of the measurement location, then the computed $B_{TOT}$ tends to deviate from the reference value (which is based purely on the Earth's magnetic field). In this way, method 140 may prevent or eliminate inaccurate bias estimation that can be caused by external interference (e.g., magnetic ore or other magnetic structures or wells that are within magnetic sensory range).

The effectiveness of the disclosed method embodiments is now shown in more detail by way of the following non-limiting synthetic examples. FIGS. 8A, 8B, 8C, and 8D (collectively FIG. 8) depicts plots of computed magnetometer bias versus time. In FIGS. 8A and 8C, the bias correction is provided by the method described with respect to FIG. 9A in the '297 Patent. In FIGS. 8B and 8D, the bias correction is provided by method 120 disclosed herein (FIG. 6). In these synthetic examples, the drill collar rotation rate increased from 60 rpm to 240 rpm at 600 seconds. The sensor housing slowly rotated through 3 full rotations at 4 rpm beginning at 400, 800, and 1200 seconds and was otherwise geostationary at a toolface angle of −90 degrees. The bias estimation algorithm was initiated three times (at 400, 800, and 1200 seconds). The wellbore inclinations were 0 degrees (FIGS. 8A and 8B) and 1 degree (FIGS. 8C and 8D). The wellbore azimuth was 50 degrees from 0 to 900 seconds and then increased linearly to 75 degrees at 1800 seconds for the example shown on FIGS. 8C and 8D. The magnetometer biases were as follows: $b_x$=3000 nT, $b_y$=100 nT, and $b_z$=200 nT.

The magnetometer bias estimation methods disclosed herein were found to provide an accurate and reliable magnetometer bias estimation at very low inclinations (at both 0 and 1 degree in these examples) as compared to the prior art method. At an inclination of zero degrees (FIGS. 8A and 8B), the method disclosed herein (in FIG. 6) estimated magnetometer bias values that closely matched the actual values as shown in FIG. 8B (the estimated values are shown as open circles and the actual values as lines in each of the plots). In contrast, the prior art method overestimated the axial magnetometer bias $b_x$ by a factor of about 15 and had bias estimate errors of about 100 percent (or more) for the cross-axial magnetometer biases $b_y$ and $b_z$ as shown in FIG. 8A. At an inclination of one degree (FIGS. 8C and 8D), the method disclosed herein (in FIG. 6) again estimated magnetometer bias values that closely matched the actual values as shown in FIG. 8D. In contrast, the prior art method overestimated the axial magnetometer bias $b_x$ by about 20-25 percent and had bias estimate errors of about 100 percent (or more) for the cross-axial magnetometer biases $b_y$ and $b_z$ as shown in FIG. 8C.

While not shown in FIG. 8, additional simulations were performed at inclination values of 5 and 10 degrees. Both methods were found to provide essentially equivalent estimates of the magnetometer bias values that closely matched the actual values (for the particular example wellbore and bias parameters used).

With further reference to the methods disclosed in FIGS. 5, 6, and 7, it will be appreciated that the computed survey parameters may be stored in downhole memory and/or transmitted to the surface, for example, via mud pulse telemetry, electromagnetic telemetry, wired drill pipe, or other telemetry techniques. In some embodiments, the accuracy of the wellbore dynamic surveying operation may be sufficient such that the drilling operation may forego the use of conventional static surveying techniques. In such embodiments, the wellbore survey may be constructed at the surface based upon the transmitted measurements and/or downhole using a downhole processor.

With still further reference to FIGS. 5, 6, and 7, the computed survey parameters may be used to control and/or change the direction of drilling. For example, in many drilling operations the wellbore (or a portion of the wellbore) is drilled along a drill plan, such as a predetermined direction (e.g., as defined by a prescribed wellbore inclination and wellbore azimuth) or a predetermined curvature. In some embodiments, a computed wellbore azimuth may be compared with a desired or planned wellbore azimuth. The drilling direction may be changed, for example, in order to meet the drill plan, or when the difference between the computed and desired survey parameters or curvature exceeds a predetermined threshold. Such a change in drilling direction may be implemented, for example, via actuating steering elements in a rotary steerable tool deployed above the bit (such as one of the rotary steerable tools described above). In some embodiments, the survey parameters may be computed in roll-stabilized housing in the RSS, which may further evaluate the survey parameters and the drill plan to compute a new drilling direction in order to meet the plan. In some embodiments the survey parameters may be sent to the surface using telemetry so that the survey parameters may be analysed. In view of the survey parameters, drilling parameters (e.g., weight on bit, rotation rate, mud pump rate, etc.) may be modified and/or a downlink may be sent to the RSS to change the drilling direction. In some embodiments both downhole and surface control may be used.

It will be appreciated that the methods 100, 120, 140 described herein may be configured for implementation via one or more controllers deployed downhole (e.g., in roll stabilized housing 70 in RSS tool 50 or in MWD tool 60 as shown on FIGS. 1 and 2). A suitable controller may include, for example, a programmable processor, such as a digital signal processor or other microprocessor or microcontroller and processor-readable or computer-readable program code embodying logic. A suitable processor may be utilized, for example, to execute the method embodiments (or various steps in the method embodiments) described above with respect to FIGS. 5, 6, and 7. A suitable controller may also optionally include other controllable components, such as sensors (e.g., a temperature sensor), data storage devices, power supplies, timers, and the like. The controller may also be disposed to be in electronic communication with the accelerometers and magnetometers. A suitable controller may also optionally communicate with other instruments in the drill string, such as, for example, telemetry systems that communicate with the surface. A suitable controller may further optionally include volatile or non-volatile memory or a data storage device.

Although low inclination magnetometer bias compensation for dynamic surveying and certain advantages thereof have been described in detail, it should be understood that various changes, substitutions and alterations may be made herein without departing from the spirit and scope of the disclosure.

The invention claimed is:

1. A method for drilling a subterranean wellbore, the method comprising:

rotating a bottom hole assembly (BHA) in the subterranean wellbore to drill, the BHA including a drill collar, a drill bit, a roll-stabilized housing deployed in the drill collar and configured to rotate with respect to the drill collar, and a triaxial accelerometer set and a triaxial magnetometer set deployed in the roll-stabilized housing;

using the triaxial accelerometer set and the triaxial magnetometer set to make corresponding triaxial accelerometer measurements and triaxial magnetometer measurements while rotating the BHA;

computing magnetic dip angles from the triaxial accelerometer measurements and triaxial magnetometer measurements using an inclination independent model that includes an unknown magnetometer bias;

comparing the computed magnetic dip angles with a reference magnetic dip angle; and selecting a magnetometer bias that minimizes a difference between the computed magnetic dip angles and the reference magnetic dip angle.

2. The method of claim 1, further comprising computing a wellbore azimuth from the accelerometer measurements, the magnetometer measurements, and the selected magnetometer bias.

3. The method of claim 2, wherein:

the BHA further comprises a rotary steerable drilling tool deployed uphole from the drill bit, the roll-stabilized housing deployed in the rotary steerable drilling tool; and the method further comprises changing a direction of drilling the subterranean wellbore in response to the computed azimuth via actuating a steering element on the rotary steerable drilling tool.

4. The method of claim 1, wherein the inclination independent model is azimuth independent and toolface independent.

5. The method of claim 1, wherein the inclination independent model is expressed mathematically as follows:

$$D_i = \sin^{-1}\left(\frac{G_i^T(B_i - b)}{|G_i||B_i - b|}\right)$$

wherein $D_i$ represent the computed magnetic dip angles, $G_i$ represent the accelerometer measurements, $B_i$ represent the magnetometer measurements, and b represents the magnetometer bias.

6. The method of claim 1, further comprising:

measuring a change in a rotation rate of the drill collar while rotating the BHA;

computing an eddy current compensation term from the change in the measured rotation rate and the triaxial magnetometer measurements; and wherein the computing the magnetic dip angles comprises computing magnetic dip angles from the triaxial accelerometer measurements, the triaxial magnetometer measurements, and the eddy current compensation term using an inclination independent model that includes an unknown magnetometer bias.

7. The method of claim 6, wherein the eddy current compensation term is computed as being equal to a derivative of angle X with respect to the rotation rate of the drill collar, wherein angle X is an angle between gravity and magnetic field vectors in a cross axial plane of the drill collar.

8. The method of claim 6, wherein the inclination independent model is expressed mathematically as follows:

$$D_i = \sin^{-1}\left(\frac{G_i^T(R_{eddy}(B_i - b))}{|G_i||R_{eddy}(B_i - b)|}\right)$$

wherein $$R_{eddy} = \begin{pmatrix} 1 & 0 & 0 \\ 0 & f_a & f_b \\ 0 & -f_b & f_a \end{pmatrix}$$

wherein $D_i$ represent the computed magnetic dip angles, $G_i$ represent the accelerometer measurements, $B_i$ represent the magnetometer measurements, b represent the magnetometer bias, and $f_a$ and $f_b$ are mathematical relations of the eddy current compensation term such that $f_a$ compensates an amplitude of an eddy current interference and $f_b$ compensates a phase of the eddy current interference.

9. The method of claim 1, wherein the difference between the computed magnetic dip angles and the reference magnetic dip angle is a root mean square error expressed mathematically as follows:

$$\epsilon(b) = (D(b) - D_{ref})^T(D(b) - D_{ref})$$

wherein $\epsilon$ represents the root mean square error, D represents a matrix of computed magnetic dip angles, and $D_{ref}$ represents a matrix of reference magnetic dip angles.

10. The method of claim 1, further comprising:

computing a total magnetic field strength from the magnetometer measurements and the selected magnetometer bias;

comparing the computed total magnetic field strength with a reference total magnetic field strength;

accepting the selected magnetometer bias when a difference between the computed total magnetic field strength and the reference total magnetic field strength is less than a threshold; and rejecting the selected magnetometer bias when a difference between the computed total magnetic field strength and the reference total magnetic field strength is greater than the threshold.

11. A rotary steerable system for drilling a subterranean wellbore, the system comprising:

a roll-stabilized housing deployed in a drill collar, the drill collar configured to rotate with a drill string, the roll-stabilized housing configured to rotate independent of the drill collar while drilling;

a triaxial accelerometer set and a triaxial magnetometer set deployed in the roll-stabilized housing; and a controller deployed in the roll-stabilized housing, the controller configured to:

cause the triaxial accelerometer set and the triaxial magnetometer set to make corresponding triaxial accelerometer measurements and triaxial magnetometer measurements;

compute magnetic dip angles from the triaxial accelerometer measurements and the triaxial magnetometer measurements using an inclination independent model that includes an unknown magnetometer bias;

compare the computed magnetic dip angles with a reference magnetic dip angle; and select a magnetometer bias that minimizes a difference between the computed magnetic dip angles and the reference magnetic dip angle.

12. The rotary steerable system of claim 11, wherein the controller is further configured to:

compute a wellbore azimuth from the accelerometer measurements, the magnetometer measurements, and the selected magnetometer bias; and actuate a steering element on the rotary steerable system to change a direction of drilling in response to the computed wellbore azimuth.

13. The rotary steerable system of claim 11, wherein the inclination independent model is expressed mathematically as follows:

$$D_i = \sin^{-1}\left(\frac{G_i^T(B_i - b)}{|G_i||B_i - b|}\right)$$

wherein $D_i$ represent the computed magnetic dip angles, $G_i$ represent the accelerometer measurements, $B_i$ represent the magnetometer measurements, and b represents the magnetometer bias.

14. The rotary steerable system of claim 11, wherein the controller is further configured to:

measure a change in a rotation rate of the drill collar while rotating the drill collar; and compute an eddy current compensation term from the change in the measured rotation rate and the triaxial magnetometer measurements;

wherein the compute the magnetic dip angles comprises compute magnetic dip angles from the triaxial accelerometer measurements, the triaxial magnetometer measurements, and the eddy current compensation term using an inclination independent model that is expressed mathematically as follows:

$$D_i = \sin^{-1}\left(\frac{G_i^T(R_{eddy}(B_i - b))}{|G_i||R_{eddy}(B_i - b)|}\right)$$

wherein $$R_{eddy} = \begin{pmatrix} 1 & 0 & 0 \\ 0 & f_a & f_b \\ 0 & -f_b & f_a \end{pmatrix}$$

wherein $D_i$ represent the computed magnetic dip angles, $G_i$ represent the accelerometer measurements, $B_i$ represent the magnetometer measurements, b represent the magnetometer bias, and $f_a$ and $f_b$ are mathematical relations of the eddy current compensation term such that $f_a$ compensates an amplitude of an eddy current interference and $f_b$ compensates a phase of the eddy current interference.

15. The rotary steerable system of claim 11, wherein the controller is further configured to:

compute a total magnetic field strength from the magnetometer measurements and the selected magnetometer bias;

compare the computed total magnetic field strength with a reference total magnetic field strength;

accept the selected magnetometer bias when a difference between the computed total magnetic field strength and the reference total magnetic field strength is less than a threshold; and reject the selected magnetometer bias when a difference between the computed total magnetic field strength and the reference total magnetic field strength is greater than the threshold.

* * * * *